United States Patent
Rettenmeier et al.

(10) Patent No.: US 11,397,270 B2
(45) Date of Patent: Jul. 26, 2022

(54) METHOD FOR OPERATING A SIGNAL FILTER AND RADIATION DETECTION SYSTEM

(71) Applicant: KETEK GmbH, Munich (DE)

(72) Inventors: Florian Rettenmeier, Munich (DE); Christian Zacher, Munich (DE)

(73) Assignee: KETEK GmbH, Munich (DE)

( * ) Notice: Subject to any disclaimer, the term of this patent is extended or adjusted under 35 U.S.C. 154(b) by 164 days.

(21) Appl. No.: 16/782,138

(22) Filed: Feb. 5, 2020

(65) Prior Publication Data

US 2020/0271599 A1    Aug. 27, 2020

(30) Foreign Application Priority Data

Feb. 25, 2019  (DE) .......................... 102019104710.2

(51) Int. Cl.
*G01N 23/22*        (2018.01)
*G01T 1/24*         (2006.01)
(Continued)

(52) U.S. Cl.
CPC ....... *G01T 1/366* (2013.01); *G01N 23/20091* (2013.01); *G01N 23/22* (2013.01);
(Continued)

(58) Field of Classification Search
CPC ........ G01N 23/22; G01N 23/223; G01T 1/24; G01T 1/241; G01T 1/247; G01T 1/36; G01T 1/366
(Continued)

(56) References Cited

U.S. PATENT DOCUMENTS 5,684,850 A    11/1997  Warburton et al.
5,870,051 A    2/1999   Warburton et al.
(Continued)

OTHER PUBLICATIONS

R. Redus., "Digitial Pulse Processors, Theory of Operation," AMPTEK, www.amptek.com, Nov. 2009, pp. 1-6.
(Continued)

*Primary Examiner* — Allen C. Ho
(74) *Attorney, Agent, or Firm* — Slater Matsil, LLP

(57) ABSTRACT

In an embodiment a method for operating a radiation detection system having at least one radiation detector and at least one signal filter includes supplying an input signal to the at least one signal filter by the at least one radiation detector, the input signal having step-shaped signal rises, each step-shaped signal rise having a rise time, determining the rise time of a respective step-shaped signal rise, specifying a waiting time for the respective step-shaped signal rise in each case such that the waiting time is greater than or equal to the rise time of the respective step-shaped signal rise and producing an output signal of the at least one signal filter, data point pairs of the input signal being processed in which a time interval of data points from each other is equal to the waiting time for the respective step-shaped signal rise, wherein at least 80% of rise times of the step-shaped signal rises lie between 10 ns and 800 ns inclusive, and wherein the at least one radiation detector includes a silicon drift detector having a radiation entry window of at least 5 mm$^2$.

12 Claims, 5 Drawing Sheets

(51) Int. Cl.
*G01T 1/36* (2006.01)
*G01N 23/20091* (2018.01)
*G01N 23/223* (2006.01)

(52) U.S. Cl.
CPC ............. *G01N 23/223* (2013.01); *G01T 1/24* (2013.01); *G01T 1/241* (2013.01); *G01T 1/247* (2013.01); *G01T 1/36* (2013.01); *G01N 2223/304* (2013.01)

(58) Field of Classification Search
USPC ...................... 378/44–50, 82–90, 98.8, 98.9; 250/370.09
See application file for complete search history.

(56) References Cited

U.S. PATENT DOCUMENTS

| | | | |
|---|---|---|---|
| 5,873,054 A | 2/1999 | Warburton et al. | |
| 6,420,710 B1* | 7/2002 | Verger | G01T 1/247 250/370.06 |
| 6,609,075 B1 | 8/2003 | Warburton et al. | |
| 6,732,059 B2* | 5/2004 | Warburton | G01T 1/185 250/264 |
| 7,339,175 B1* | 3/2008 | Drummond | G01T 1/2928 250/370.01 |
| 7,430,481 B2* | 9/2008 | Mott | G01T 1/171 702/40 |
| 7,741,609 B2* | 6/2010 | Mott | G01T 1/366 250/370.09 |
| 7,763,859 B2 | 7/2010 | Mott | |
| 7,807,973 B2 | 10/2010 | Mott | |
| 7,858,946 B2* | 12/2010 | Rohde | G01T 1/24 250/370.09 |
| 7,966,155 B2* | 6/2011 | Warburton | G01T 1/17 702/190 |
| 8,039,787 B2 | 10/2011 | Mott | |
| 8,941,072 B2* | 1/2015 | Kooijman | G01T 1/2928 250/370.06 |
| 9,103,924 B2* | 8/2015 | Nygard | H04N 5/32 |
| 9,361,275 B2* | 6/2016 | Kooijman | G01T 1/36 |
| 9,448,190 B2* | 9/2016 | Yun | H01J 35/147 |
| 9,449,781 B2* | 9/2016 | Yun | G01N 23/223 |
| 9,570,265 B1* | 2/2017 | Yun | G21K 1/06 |
| 10,795,031 B2* | 10/2020 | Ohashi | G01T 1/17 |
| 11,079,502 B2* | 8/2021 | Scoullar | G01T 1/171 |
| 2003/0040877 A1 | 2/2003 | Warburton et al. | |
| 2006/0015290 A1 | 1/2006 | Warburton et al. | |

OTHER PUBLICATIONS

Hermann Kolanoski, et al., "Particle Detectors: Basics and Applications," Chapter 17.9.1—Statistically Evenly Distributed Events, 2016, 9 pages.
KETEK GmbH, "VICO-DP; Digital Pulse Processor," Digital Pulse Processor Manual; https://www.ketek.net/wpcontent/uploads/2017/12/KETEK-VICO-DPManual-rev.-1.2.pdf, Dec. 12, 2017, 39 pages.
Glenn F. Knoll, "Radiation Detection and Measurement," Fourth Edition, Chapter 16—Pulse Processing, Chapter 17—Pulse Shaping, Counting, and Timing, 2010, 111 pages.
Gerhard Lutz, "Semiconductor Radiation Detectors, Device Physics," Chapter 6.5 Drift Detectors, Chapter 6.5.1 Linear Drift Devices, Chapter 7 The Electronics of the Readout Function, 1999, 79 pages.
Xia LLC, "microDXP Technical Reference Manual," Version 3.14, Jan. 12, 2016, pp. 1-72.

\* cited by examiner

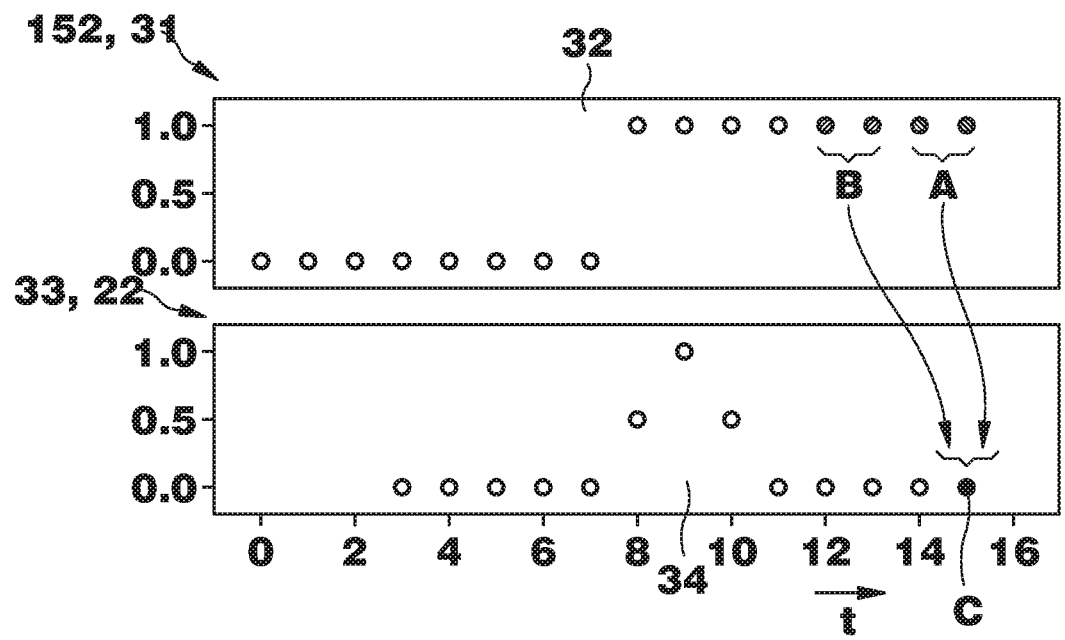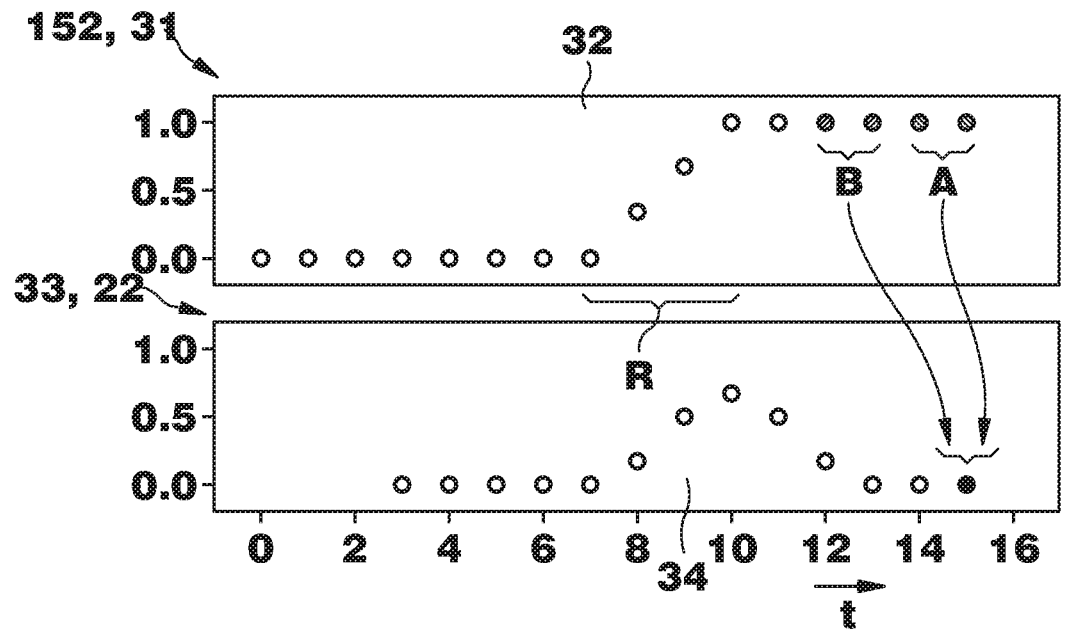

METHOD FOR OPERATING A SIGNAL FILTER AND RADIATION DETECTION SYSTEM

CROSS-REFERENCE TO RELATED APPLICATIONS

This application claims the benefit of and priority to German Application No. 102019104710.2, filed on Feb. 25, 2019, which application is hereby incorporated herein by reference.

TECHNICAL FIELD

A method for operating a radiation detection system comprising a signal filter is specified. In addition, a radiation detection system is specified with which such a method can be carried out.

BACKGROUND

U.S. Pat. Nos. 5,870,051 A, 6,609,075 B1, 7,807,973 B2 and 7,763,859 B2 refer to spectrometers for X-rays.

SUMMARY

Embodiments provide a method by which a dead time of a signal filter can be reduced.

According to at least embodiment, the method comprises the step of supplying or impressed an input signal to a signal filter. The input signal has several step-shaped signal rises succeeding in time. The signal rises, also referred to as signal increases, each have a rise time, whereby the signal rises show different rise times. The signal filter is configured to form a signal band in an output signal from each of the step-shaped signal rises. This means, in particular, that the step-shaped or stair-like input signal becomes an output signal with one deflection or one band per step. Preferably, the output signal is continuously calculated and evaluated, especially for steps detected in the input signal. This means that preferably there is a defined output signal even if no band is currently being generated. The output signal can also be referred to as filter output.

There are some types of common semiconductor radiation detectors, where holes are read out from the active volume instead of electrons, as is the case with PIN diodes or CdTe detectors, for example. Then the detector signal is inverted: Instead of step-like signal rises, step-like signal decreases are evaluated. However, the problem and the benefit of the procedure described here remain. Subsequently, only signal rises are taken into account and signal decreases are regarded as inverted signal rises. Therefore, signal decreases are conceptually covered in the following by the term signal rise in the same way.

According to at least one embodiment, the method comprises the step of buffering the input signal. This means that data points of the input signal that relate to the respective signal rise are stored permanently or, preferably, only temporarily. The buffered data points can thus be used in a time-delayed subsequent analysis. The term data points includes in particular ADC values and/or moving average values from which the output signal is calculated with a slight time delay if necessary.

According to at least one embodiment, the method comprises the step of determining the rise time of the respective signal rise. This means that the rise time is determined individually for each detected signal rise. The rise times do not necessarily have to be determined exactly, but an approximate determination can be sufficient. For example, an accuracy of 10% or 20% or 30% may be sufficient. This means, for example, that with an accuracy of 10%, the approximate rise time is at least 90% and at most 110% of an actual rise time.

According to at least one embodiment, the method comprises the step of defining a waiting time for the signal rise concerned. The waiting time is also referred to as gap time or flat-top time, so the terms waiting time and gap time are used synonymously. The waiting time is the time interval between two data points that are used for an analysis of the input signal. In particular, in this case, the data points are moving averages or alternatively, but less preferred, ADC values. In particular, the term time interval means the time interval between the oldest value of a first moving average and the newest value of a second moving average. If two signal rises occur in a time interval of the length Peaking Time plus Waiting Time, these signal rises cannot usually be analyzed separately. A shorter waiting time thus leads to an increased sensitivity. The peaking time can also be called pulse forming time.

According to at least one embodiment, the waiting time T used to analyze a given signal rise is set to be greater than or equal to the rise time R of the signal rise concerned. That is, $T \geq R$. Preferably, $R \leq T \leq 1.5\,R$ or $R \leq T \leq 1.2\,R$ or $R \leq T \leq 1.1\,R$ applies.

According to at least one embodiment, the method comprises the step of generating an output signal of the signal filter. In this step, data point pairs of the input signal are processed, a time interval between the data points in the respective data point pair each being equal to the waiting time for the relevant signal rise. In particular, the term time interval means the time interval between the oldest value of a first moving average and the newest value of a second moving average. The term data point pairs here refers in particular to two moving mean values with the temporal offset of the waiting time, but two ADC data values are also possible having the temporal offset of the waiting time.

In at least one embodiment, the method serves to operate a signal filter and comprises the following steps:

A) supplying an input signal to the signal filter, wherein the input signal has step-shaped signal rises each with a rise time;

B) optionally buffering the input signal so that data points of the input signal relating to the respective signal rise are stored at least temporarily;

C) determining the rise time of the respective signal rise;

D) in each case specifying a waiting time for the respective signal rise so that the waiting time is greater than or equal to the rise time of the respective signal rise; and E) producing an output signal of the signal filter, data point pairs of the input signal being processed, in which a temporal distance between the data points is equal to the waiting time for the signal rise in question.

With this method it is possible to operate a signal filter in such a way that the waiting time or gap time is set individually for each detected signal rise. The signal filter is therefore operated with an adaptive gap time. This means that signal rises in the input signal that are close in time can be correctly analyzed and/or evaluated with an increased probability.

According to at least one embodiment, a signal band is generated in the output signal for each signal rise. The signal band, for example, is triangular or trapezoidal or Gaussian or Lorentz-shaped. Between successive signal bands, the output signal preferentially drops to zero or almost zero. Near zero, for example, means a maximum value of 5% or 2% of a maximum value of the output signal for which the signal filter is configured. The maximum value refers in particular to a maximum energy of the radiation detection system, for example, 40 keV, and not to a currently detected energy, for example, 2 keV or 6 keV.

According to at least one embodiment, a height and/or an area of the signal band is proportional or approximately proportional to a step height and/or to an integral of the associated signal rise. This means that the height of the signal band and/or of the integral of the signal band provides information about the height of the respective step in the input signal. The height and/or area of the signal band is preferably independent or approximately independent of the rise time of the assigned signal rise.

According to at least one embodiment, the steps A) and E), and optionally B), are performed continuously and simultaneously. This means that a continuous input of the input signal to the signal filter, a continuous buffering of the input signal in the signal filter and a continuous generation of an output signal from the signal filter can be carried out.

According to at least one embodiment, the steps C) and D) are each triggered or caused by one detected signal rise. This means that the waiting time can remain the same until a new rise time is determined in a further step C) due to a subsequent signal rise.

According to at least one embodiment, a change from the waiting time to the following new waiting time takes place abruptly. The waiting time can therefore be discontinuous over time. For example, the waiting time as a function of time is not given by a differentiable function. Alternatively, the waiting time can be changed continuously and without jumps.

According to at least one embodiment, the waiting times associated with the signal rises are partly less than 0.4 times or 0.3 times or 0.2 times and/or partly more than 2 times or 3 times or 4 times an average waiting time. Partial means in particular a proportion of at least 5% or 10%. This means that the set waiting times have a relatively wide probability distribution. For example, the waiting times are approximate in a Gaussian distribution or in a Poisson distribution.

According to at least one embodiment, buffering takes place in optional step B) up to a maximum waiting time, so that data points of the input signal are discarded after the maximum waiting time has elapsed. In particular, so many ADC data and/or data points are buffered that the filter output can be realized with the maximum waiting time. This means preferably buffering data for at least twice the peaking time plus the waiting time.

The maximum waiting time, especially for a certain input signal, is preferably invariable. The maximum waiting time is specified, for example, by a detector connected to the signal filter. As long as the detector in question is connected, the maximum waiting time remains the same. For example, the maximum waiting time exceeds the average waiting time by at least a factor of 1.25 or 1.5 or 2.5. Alternatively or additionally, the maximum waiting time exceeds the average waiting time by at most a factor of 5 or 3 or 2.5.

According to at least one embodiment, a further signal rise, which follows the preceding signal rise within the sum of peaking time plus waiting time, is discarded during signal evaluation of the input signal. This means that the further signal rises closely following the preceding signal rise is not taken into account in the evaluation and/or in the output signal. Preferably, both signal rises close to each other in time are discarded, since the corresponding signal band in the output signal no longer shows any proportionality to the step height.

According to at least one embodiment, the output signal is generated from the data point pairs, in particular from several ADC data values from which the filter output is calculated, using a trapezoidal filter, a Gaussian filter or a Cusp filter. A floating mean value filtering may be present.

According to at least one embodiment, the input signal is a pre-amplified and preferably digitized signal of a radiation detector. This means that the signal filter can be connected to a preamplifier and to an analog-to-digital converter, ADC for short.

According to at least one embodiment, at least 80% or 90% or 98% of the rise times shall be at least 5 ns or 10 ns or 20 ns or 50 ns. Alternatively or additionally, the aforementioned proportions of the rise times are at most 800 ns or 500 ns or 300 ns or 200 ns or 60 ns. This means that the rise times are relatively short.

In addition, a signal filter is specified. The signal filter is configured to perform a method as described in conjunction with one or more of the above-mentioned embodiments. Features of the signal filter are therefore also disclosed for the method and vice versa.

Further, a computer program is also specified that is executable on a computer. The computer program is configured to perform a procedure as described in conjunction with one or more of the above-mentioned embodiments. Features of the computer program are therefore also disclosed for the method and vice versa.

Moreover, a radiation detection system capable of performing a method as described in conjunction with one or more of the above-mentioned embodiments is also specified. Features of the radiation detection system are therefore also disclosed for the method and vice versa.

In at least one embodiment, the radiation detection system comprises one or more radiation detectors and one or more signal filters, the at least one signal filter being configured to perform the foregoing method. In addition, the radiation detection system comprises one or more evaluation units.

According to at least one embodiment, the radiation detector comprises one or more radiation-sensitive regions. The at least one radiation sensitive region is connected to at least two electrodes. Preferably a bias voltage can be applied to the radiation-sensitive region via the electrodes. Furthermore, a detector output signal is tapped at the electrodes or at one of the electrodes, the detector output signal can be forwarded to a preamplifier and subsequently to an ADC. The signal filter is preferably connected directly or indirectly to the ADC. Thus, the radiation detector is configured to supply the input signal to the signal filter during operation.

According to at least one embodiment, the signal filter is configured to supply the output signal to the processing unit during operation. The evaluation unit is, for example, an IC such as an FPGA, a microcontroller or an ASIC. In addition, the evaluation unit can be configured as a program that runs on a data processor, such as a computer or a tablet.

According to at least one embodiment, the radiation detection system is configured for energy dispersive spectroscopy of X-rays. Thus, the evaluation unit can be equipped to generate X-ray spectra. The radiation detection system is therefore in particular an EDX system, where EDX stands for Energy Dispersive X-ray spectroscopy.

According to at least one embodiment, the radiation detector is a silicon drift detector, SDD for short. The SDD is preferably sensitive to X-rays. For example, the SDD has a radiation entrance window and/or a radiation entrance area with an area of at least 5 mm² or 10 mm² or 20 mm² or 50 mm². Alternatively or in addition, this area shall not exceed 500 mm² or 250 mm².

BRIEF DESCRIPTION OF THE DRAWINGS

In the following, a method and a radiation detection system are explained in more detail with reference to the drawing on the basis of exemplary embodiments. Same reference signs indicate the same elements in the individual figures. However, there are no references to scale shown, rather individual elements may be exaggeratedly large for a better understanding.

In the figures:

FIGS. 6 to 8 show schematic representations of input signals and output signals for the methods;

DETAILED DESCRIPTION OF ILLUSTRATIVE EMBODIMENTS

Figure 1:
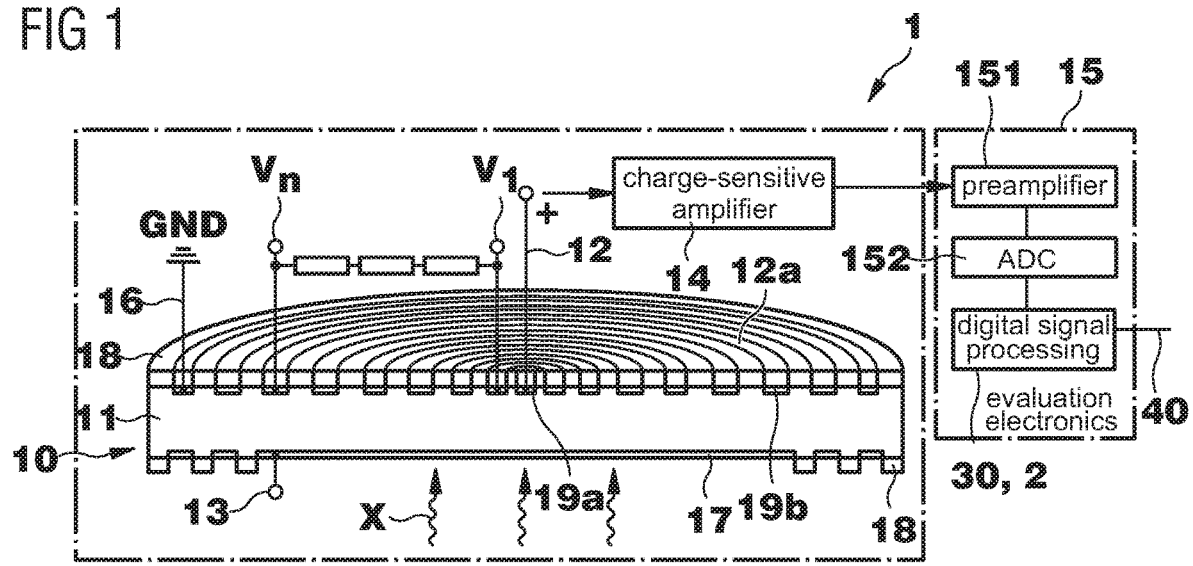
FIG. 1 shows a schematic perspective sectional view of an exemplary embodiment of a radiation detection system.

FIG. 1 shows an exemplary embodiment of a radiation detection system 1. The radiation detection system 1 is especially configured for energy dispersive X-ray spectroscopy (EDX). The energy dispersive spectroscopy of X-rays has far-reaching applications in research and industry, especially in material analysis. The non-destructive analysis of the atomic composition of a sample using EDX is particularly widespread, for example in industrial quality control, in the geosciences or in waste recycling.

The basis for this is the excitation of samples, mostly with primary X-rays or electrons, and the energy dispersive measurement of the emitted fluorescence radiation through the transition of electrons excited in the sample back to the ground state. By comparing the measured fluorescence spectrum of the sample with the known energies of characteristic X-ray lines of the periodic table of chemical elements, the elements present in the sample can be identified and, after suitable calibration, the concentration of the respective element can also be determined from the intensity of the respective characteristic lines.

In practice, X-ray fluorescence analyses are mostly performed in laboratory benchtop devices, with portable hand-held devices or via EDX modules in electron microscopes such as SEMs or TEMs. The requirements for the detector are a compact design, a high energy resolution for the exact identification of X-ray lines, large active areas and a low background noise. Therefore, semiconductor radiation detectors and in particular silicon drift detectors, SDDs for short, are mostly used.

A modern form of semiconductor radiation detectors is the silicon drift detector, see FIG. 1. With such a radiation detector 10, a large, usually round n− semiconductor volume is depleted as a radiation-sensitive region 11 via the principle of sideways depletion from the direction of a p⁺ rear contact 13 towards a radiation entry window 17 and metallic drift rings 12a by applying a reverse voltage. The anode 12 is an n+ contact 19a, which is preferably implanted in the detector center. The thus depleted area of the semiconductor serves as an active volume 11 for the absorption of X-rays X.

The type of doping illustrated in FIG. 1, the materials used and the exact structure, for example, with regard to ring voltage generation via voltage dividers, are only examples. Depending on the design, the structural and material set up of the radiation detector 10 may differ significantly from that shown in FIG. 1. Only the basic principle of reading charges at an electrode by generating a suitable potential field shall be illustrated. The method described here can therefore also be used for other detector types.

In this volume 11 electron-hole pairs resulting from radiation interactions are separated by the applied voltage. The number of electron-hole pairs is proportional to the energy of the absorbed photon. To read out these signal charges, lower and lower voltages V1 . . . Vn are applied to the drift rings 12a with decreasing radius, so that the potential gradient for electrons in the active volume 11 always points to the anode 12, 19a. Electrons drift to the anode 12, 19a and are read out there. Holes flow off via the rear contact 13.

On the rings 12a there are preferably p⁺-doped areas 19b. Between the rings 12a, areas of an insulation layer 18, for example, of $SiO_2$, can be placed. The radiation entry window 17 can be formed by a p⁺-doped layer and/or by a window material which is transparent to the radiation to be detected and which protects the radiation detector 10. A further electrode 16 is preferably attached to one of the outermost rings 12a as earth connection GND. The anode 12 is electrically followed by a charge-sensitive amplifier 14, which is connected to an evaluation electronics 15 preferably by means of a preamplifier 151, an ADC 152 and a digital signal processing 30 with signal filters 2. The evaluation electronics 15, for example, is an electrical circuit on which analog components and ICs are connected and/or which is integrated in a computer. An energy spectrum 40 is preferably output by the evaluation electronics 15.

Signal electrons read out by the radiation detector 10 are thus preferably converted into a voltage signal in the detector module by an application-specific integrated circuit, ASIC for short. In particular, this ASIC is a very low-noise, charge-sensitive CMOS amplifier 14 which collects electrons from the radiation detector 10 on a feedback capacitance and generates a voltage signal proportional to the time integral of the input current by connecting operational amplifiers as integrators at the output of the detector module. Other ASICs or individual transistors are also possible as charge-sensitive amplifier 14.

If an electron cloud arrives at the anode 12, the charge on the feedback capacitance and thus also the output signal of the charge-sensitive amplifier 14 increases sharply. Typical signal rise times range from several tens of nanoseconds to several hundred nanoseconds. The rise time depends on the drift time of the electron cloud and thus in particular on the location of the photon absorption in the detector and on the detector size. The height of the pulse is proportional to the number of signal charges and thus to the energy of the absorbed photon.

According to the example in FIG. 1, the radiation detector 10 contains the charge-sensitive amplifier 14, which converts signal electrons into voltage signals. On the other hand, the preamplifier 151 for filtering, conditioning and/or amplification is located in the evaluation electronics 15. The radiation detector 10 and the evaluation electronics 15 can be separate components, symbolized in FIG. 1 by dash dot lines. However, it is also possible that the charge sensitive amplifier 14 and the preamplifier 151 are both integrated into the detector module. The explicit separation of the preamplifier 151 and the charge-sensitive amplifier 14 and/or the division into the detector module and the evaluation electronics 15 shown is therefore only optional.

Figure 2:
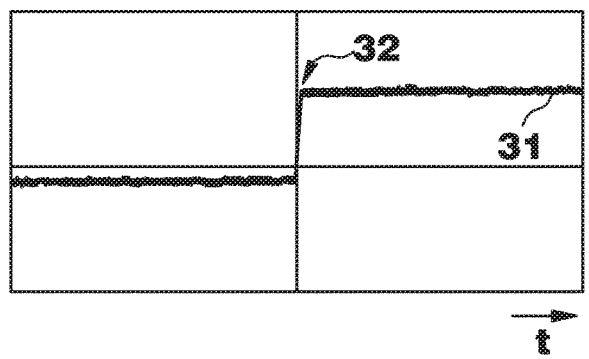
FIGS. 2 and 3 show schematic representations of an input signal for a method.

FIG. 2 shows an example of a voltage pulse at the output of the detector module due to a radiation interaction in the radiation detector 10. A time interval of approximately 1 ρs is shown. The signal shown essentially corresponds to the input signal 31 at the signal filters 2, whereby a preamplifier and an ADC are preferably connected in between. The input signal 31 has exactly one step-shaped signal rise 32 in the time range shown. Before and after the signal rise 32, the input signal 31 is approximately constant, with the input signal 31 rising very slowly because of the detector leakage current before and after signal rise 32.

The object of the evaluation electronics 15 is to determine the signal levels of these voltage pulses 32 at the output of the detector module. Since the height of such a voltage pulse 32 is proportional to the number of charges released by the radiation interaction and thus is also proportional to the energy of the absorbed photon, the qualitative form of the energy spectrum 40 can be inferred from the relative frequency of the pulse heights. This analysis is performed using a digital signal processing 30 after the signal has passed through the 151 preamplifier system and an ADC 152.

The voltage pulses 32 from radiation interactions are superimposed by the detector leakage current. This leakage current is also read out by the potential curve in detector 10 and integrated into the charge-sensitive amplifier; because that the voltage signal shows a slight increase caused by the detector leakage current even without voltage pulses. Due to the finite capacitance in the charge-sensitive amplifier, this may be discharged at a certain threshold voltage, also referred to as a reset, resulting in a sawtooth-like output signal at the detector module, see FIG. 3.

The radiation detection system, which can be regarded as a spectrometer, thus consists essentially of the energy dispersive X-ray detector 10, which is mostly a semiconductor radiation detector such as the silicon drift detector, and of the evaluation electronics 15, preferably comprising or consisting of preamplifier 151, ADC 152 and digital signal processing 30.

Figure 4:
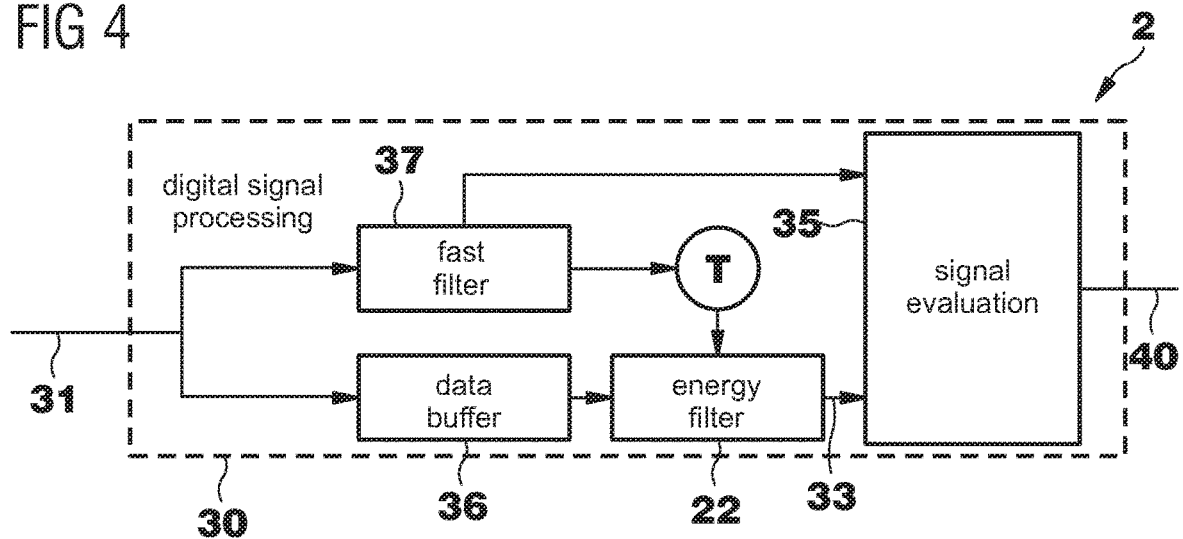
FIGS. 4 and 5 show schematic block diagram representations of signal filters.
Figure 5:
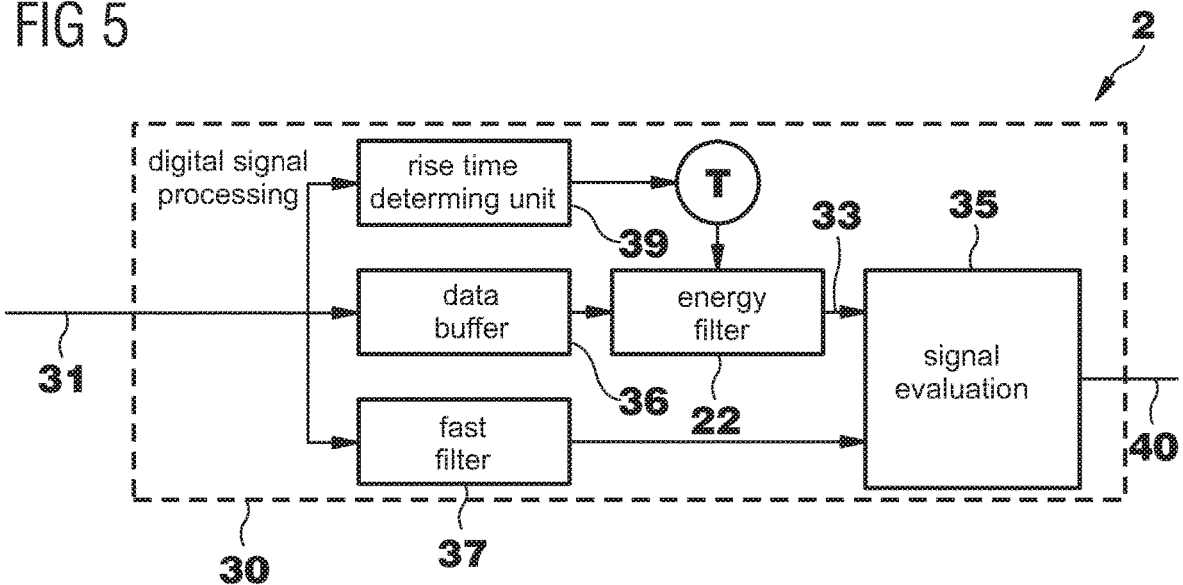

FIGS. 4 and 5 illustrate schematic block diagram representations of examples of methods in signal filters 2 described here. The input signal 31 is routed in parallel to an optional data buffer 36, to a fast filter 37 and, if necessary, to a unit 39 for determining the rise time. The determined waiting time T is transmitted to an energy filter 22, which is also optionally connected to the data buffer 36. Furthermore, a signal evaluation/communication 35 is preferably available, which can receive data from the energy filter 22 as well as from the fast filter 37. The task of the signal evaluation/communication 35 is, among other things, the extraction of values from the energy filter 22 at suitable times and the calculation of the energy spectrum 40.

In the evaluation electronics 15, further analog signal processing often takes place, for example, amplification and filtering, before the preamplifier signal is digitized in an analog-to-digital converter 152. For example, an ADC of type AD9649 of the manufacturer Analog Devices can be used. The digital further processing of the signal for the measurement of the X-ray spectrum is preferably carried out in a programmable digital computing unit of the evaluation electronics, which is usually an FPGA, whereby FPGA stands for Field Programmable Gate Array, or (at the customer) stands for programmable logic gate arrangement. For example, a Spartan-7 FPGA from Xilinx is used.

Via an external communication interface, for example, via USB, Ethernet or SPI, commands can be sent to the evaluation electronics, for example, commands such as 'Start measurements', 'Configure filter', and so on, and data can be read out. For example, a spectrum 40 can be transmitted to a terminal device for further evaluation.

Figure 3:
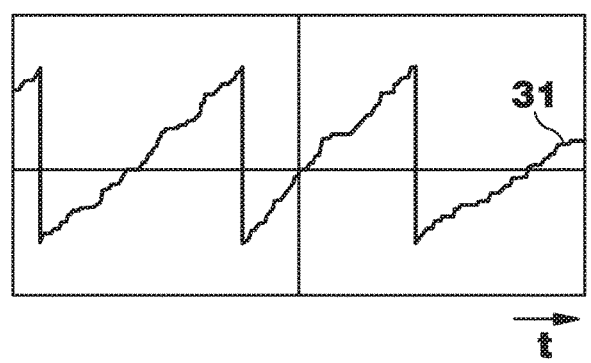

Such a structure is sketched, for example, in the publication U.S. Pat. No. 5,870,051 A, see in particular FIGS. 1 and 3. Contrary to what is shown in this publication in FIG. 2, the levels FIPPI and DSP can be implemented in the same FPGA and a further D/A conversion can be omitted. The disclosure content of this publication, in particular with regard to FIGS. 2 and 3, is incorporated by reference.

In the programmable digital computing unit 30 of the evaluation electronics 15, the energy spectrum 40 is calculated from the ADC data. Several digital filter outputs are usually calculated in parallel from the ADC data. The most common filters are sliding mean value filters, often with trapezoidal step responses, but so-called Cusp filters are also possible, in which the ADC data is weighted differently.

Preferably at least two digital signal filters 2 are calculated:

A first filter with a very small time constant, which has a high temporal resolution, is used to detect signals, for example, to determine the number and timing of the voltage pulses. Common names for this filter 37 are Fast Filter, Pulse Detection Filter or Peak Detect Filter.

A second filter with a longer time constant is used for efficient noise suppression and energy determination. Common names for such a second filter 22 are Energy Filter or Slow Filter.

In addition, further filters with average time constants can be used, which are used in particular to correct the detector leakage current (also known as baseline correction). A functional block diagram of the programmable digital processing unit is shown in FIG. 1 of document U.S. Pat. No. 7,763,859 B2 or in FIG. 6 of document U.S. Pat. No. 6,609,075 B1. The disclosure content of these documents, in particular with regard to the figures mentioned, is incorporated by reference.

To detect step-shaped signals, the fast filter output is preferably tested against a limit value, and if this value is exceeded, the energy value is taken from the energy filter at a suitable time shortly thereafter, for example, by searching for the maximum in the energy filter output in a narrow time range after the limit value has been exceeded. This is shown, for example, in connection with FIG. 5C or 8A in document U.S. Pat. No. 5,873,054 A. The disclosure content of this document, in particular with regard to these figures, is incorporated by reference.

A further task of the fast filter is the rejection of sum events, so-called pile-ups, which occur when two signals follow each other quickly. In this case, the energy filter cannot be evaluated because its height does not correspond to the correct signal height, but is composed of the sum of several individual events. If the fast filter output exceeds the limit value several times in a defined period of time, the signals are rejected, also known as pile-up rejection. This is also shown in document U.S. Pat. No. 5,873,054 A.

The longer the energy filter is in time, the greater the time interval between two signals must be in order to be able to evaluate both. The minimum time interval for correct evaluation is the sum of the peaking time and the gap time of the energy filter. These two terms are explained below. As an example, the step-shaped response of a trapezoidal filter is shown in FIG. 5A of document U.S. Pat. No. 7,807,973 B2. The disclosure content of this document, in particular regarding this figure, is incorporated by reference.

To determine the energy spectrum, especially in energy dispersive X-ray spectrometers, step-shaped signals must be evaluated in the detector signal, whereby the step height of the signals contains information about the energy of the detected radiation. A filter, also known as an energy filter, with a trapezoidal step response, which is calculated from the difference between two moving averages, is often used to determine the energy.

At each time step, the mean value is calculated from a certain number of the most recent values of an input signal 31, preferably from ADC values 152. The duration of the averaged ADC values is called Peaking Time, and in the example in FIG. 6 this is two time steps. FIG. 6 schematically shows the input signal 31, ADC in the upper half, and the output signal 33 in the lower half.

For the first moving average, the two ADC values A are averaged. The second moving average value is calculated from the same number of values from the adjacent, next-older ADC values B. To calculate the filter output, the older moving average value B is now subtracted from the newer moving average value A, so that a new value C is available in the filter output. An ideal step signal of the ADC values thus becomes a signal band 34 of triangular form in the filter output 33, where the maximum of the filter output 33 equals the step height of the ADC values, that is, one.

However, signal pulses in the detector output signal of a radiation detector 10, for example, a silicon drift detector, SDD for short, are not ideal steps, but have rise times between a few 10 ns and several 100 ns due to drift times in the detector, electrical capacitances and finite amplifier slopes, for example. If one calculates the filter output 33 for a pulse with a rise time of two time steps according to the scheme described above, the time curve of the output signal 33 shown in FIG. 7 is obtained.

Due to the finite rise time R of the signal rise 32, the signal band 34 widens in the filter output signal 33. In addition, the full step height of the ADC signal 31 is no longer reached in the filter output 33. At present, the height of the signal band 34 is about 0.6 instead of 1 in the input signal 31. A correct determination of the step height 32 is therefore not possible with this energy filter. For the correct evaluation of the step height 32, the energy filter 2 therefore uses a time interval, that is, the waiting time T or gap time, between the two moving mean values, see FIG. 8.

Figure 8:
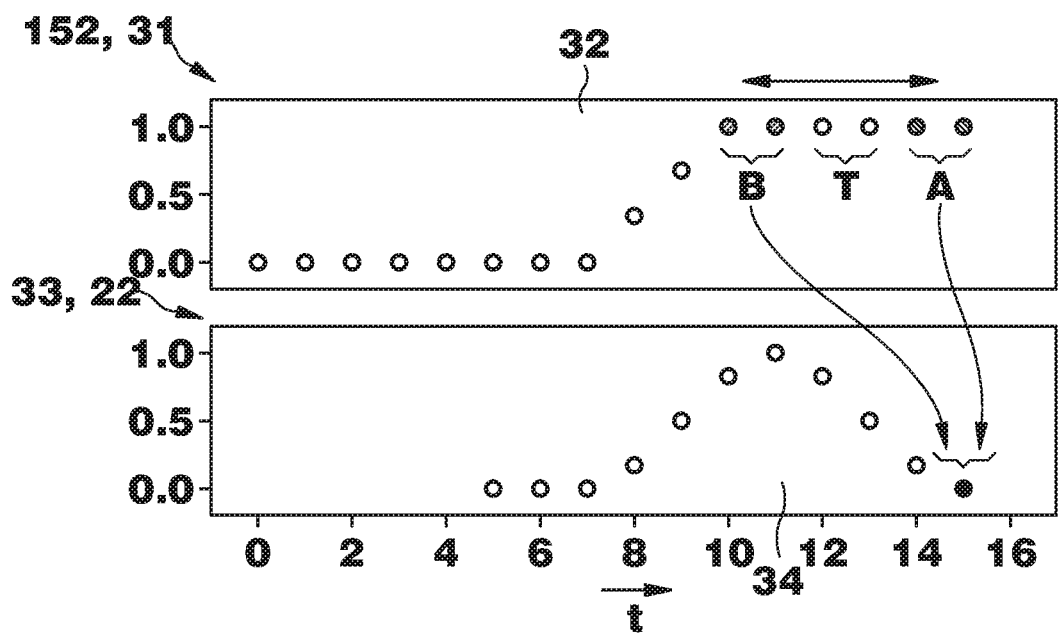

As a double arrow, FIG. 8 also illustrates the time interval between the data points A and B, which in this case are moving averages with an averaging duration of two steps. This distance is equal to the waiting time T (two time steps in this example) plus the peaking time (two time steps), that is, is equal to four time steps.

ADC values in this time interval are not used in this time step to calculate the energy filter output 33 or are weighted for this time step with the factor zero. The time interval T in this example is two time steps and is called Gap Time. If the gap time is equal to or greater than the rise time R of the step signal, the filter output 33 reaches the correct step height. In this example, T=two time steps=R. The reason for the correct determination of the step height is that at one point in time, one moving average value is completely before the step signal 32 and one moving average value is completely after the step signal 32. This is always fulfilled as long as T≥R applies.

In the example shown here, all ADC values within a moving average are equally weighted. Thus, the latest moving average is calculated by forming the sum of the two ADC values A and dividing by the number of values. It is also possible to weight the ADC values differently, for example, to take the most recent value into account twice. This results in step responses that deviate from the simple trapeze. However, this does not change the further procedure of the evaluation and the necessity of a waiting time T. A moving average value without individual weighting, that is, a trapezoidal filter, is preferred; alternatively, moving average values with weighting, like Cusp filters, can be used.

Figure 9:
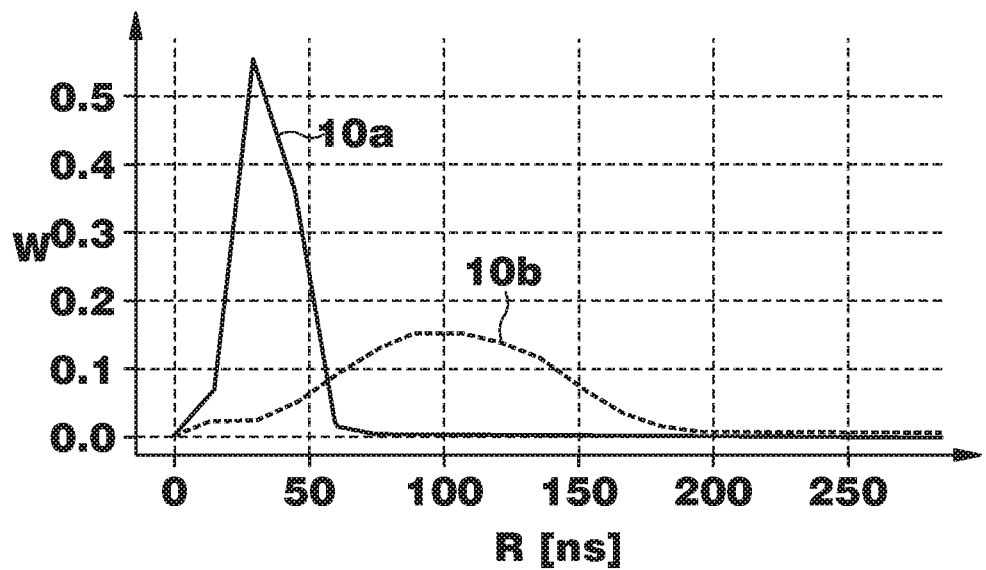
FIG. 9 shows schematic representation of rise time distributions for radiation detection systems.

One problem now lies in the fact that in particular a silicon drift detector 10 does not have a constant rise time R due to its principle of construction. The reason for this is that an absorption of X-ray photons takes place both close to the anode, that is, at the center of detector 10, and far from the anode, that is, at the edge of detector 10. Absorption remote from the anode leads to a longer drift time in the detector 10 and, thus, to a longer rise time. For a uniformly irradiated detector 10, this results in a distribution of rise times that is wider the larger the detector area is. This is illustrated in FIG. 9 for two silicon drift detectors 10a, 10b, where the rise time R is plotted against the relative frequency W for each.

Figure 10:
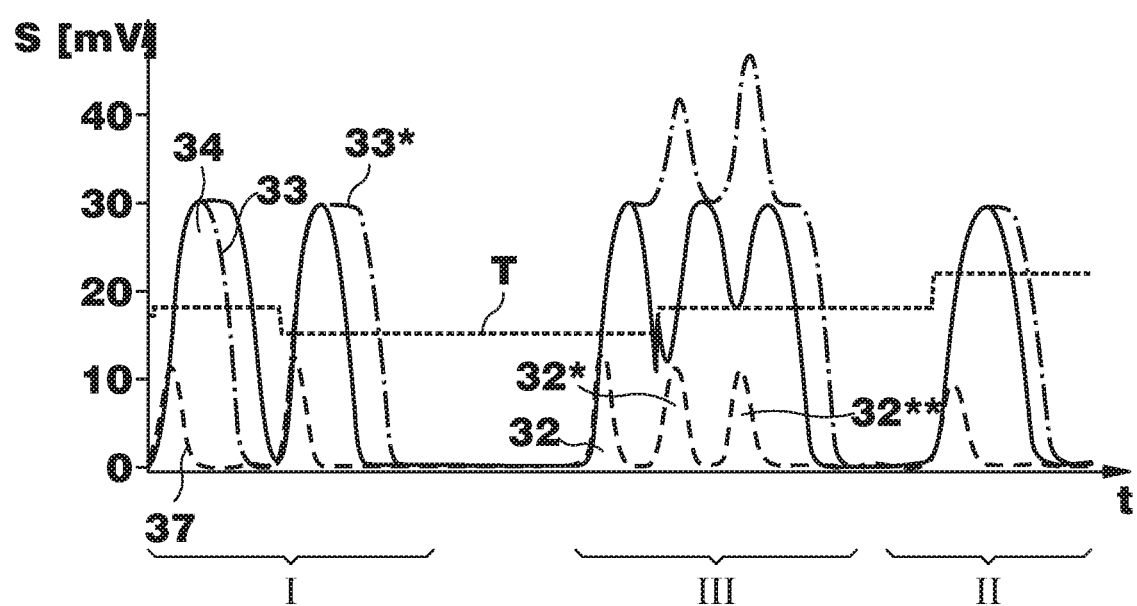
FIG. 10 shows a schematic representation of time curves of waiting times and output signals for a method and for a modification of a method.

In the signal evaluation, as far as possible all impulses should be recorded correctly, which is why the waiting time T is longer than the longest expected rise time in the application of conventional methods. For example, as shown in FIG. 10, the maximum rise time for the SDD detector 10a with a radiation entrance area of 20 mm$^2$ is 70 ns, and for the SDD detector 10b with a radiation entrance area of 80 mm$^2$ it is 220 ns.

The disadvantage of this procedure with a fixed waiting time, however, is that the gap time is selected longer than necessary for a large proportion of the pulses and that the evaluation takes more time than necessary, since the gap time of the longest expected rise time is also used for signals with relatively short rise times. This extends the duration of the signal bands in the filter output signal 33\* and increases the probability that a second pulse occurs in the detector signal during the evaluation time and that both signals must be rejected, since the pulse heights of the individual pulses can no longer be determined correctly, corresponding to a pile-up rejection, see above.

Contrary to that, the gap time is selected adaptively in the procedure described here. The improvement in reducing dead time is in particular due to the fact that the gap time is set individually for each pulse, so that this specific gap time is equal to or greater than the rise time of the corresponding pulse. Instead of the conventional estimation for the worst case, that is, that the gap time is always fixed statically to the maximum rise time to be expected, the gap time of the energy filter 2, 22 is dynamically adapted to the rise time R of the relevant signal rise 32 for each pulse and, thus, for each signal rise 32 in the method described here.

The advantage of this method is in particular a faster evaluation, since the gap time is in many cases smaller than previously selected. This allows the throughput of signals to be increased, especially for large detectors with wide rise time distribution.

In this example, the method follows the following algorithm: First, the input signal 31, for example, the ADC data, is optionally buffered for so long that the filter output can be realized with the maximum waiting time. In particular, this means buffering data for at least twice the peaking time plus waiting time. Secondly, the rise time R of the detected pulse, that is, of the respective signal rise 32, is determined. Third, the energy filter output, that is, the associated signal band 34 of the output signal 33, is calculated with the minimum gap time T for this pulse.

A simulated output signal 33 for a method described here with a dynamic waiting time T and a filter output signal 33\* for a method with a static waiting time are illustrated in FIG. 10. The terms dynamic waiting time and adaptive waiting time are used synonymously.

Curve 37 denotes the fast filter which is operated without gap time and which is used for pulse detection. Curve 33\* refers to a static energy filter with a fixed gap time of 350 ns according to a modification of a method. Curve 33 illustrates an energy signal filter 2 with an adaptive gap time according to the method described here. Finally, the curve T shows the temporal course of the gap time. All signals shown have a nominal signal height of 30 mV, which is identical for the two curves 33, 33\*.

The first two signals, see area I in FIG. 10, have a relatively short rise time. Since the filter output 33 is adapted to the rise time R in the method described here, the adaptive filter 2 uses shorter waiting times. The waiting time of the static filter 33\*, on the other hand, remains at 350 ns, which would be necessary for the slowest possible signal of the detector 10. Both static and dynamic waiting times lead to the correct filter height of 30 mV, whereby the dynamic method takes less time to evaluate.

The voltage pulse on the right in FIG. 10, see area II, is a rather slowly rising signal, therefore a rather long waiting time is chosen in the adaptive method and the filter durations of the adaptive and the static method are only slightly different. Both the static and the dynamic determination of the waiting time lead to the correct filter height of 30 mV.

In the middle area III of FIG. 10 it is shown that there is a fast sequence of three rapidly increasing signals 32, 32\*, **32\*\*. The static procedure uses for all three signals 32, 32\*, 32\*\* the statically set waiting time of 350 ns. Since the corresponding signal band 34 in the filter output signal 33\* is thus longer than the time interval between the signals 32, 32\*, 32\*\*, overlapping effects occur in the filter output 33\*. The height of the filter output 33\* exceeds the actual signal height of 30 mV. It is therefore not possible to resolve these three signals 32, 32\*, 32\*\*** with a static waiting time of 350 ns.

However, the dynamic method recognizes that the maximum waiting time of 350 ns is not necessary for these rapidly following pulses 32, 32\*, **32\*\*, since the rise time of these pulses is significantly less than 350 ns. Instead, smaller waiting times are used, namely for each of the three pulses 32, 32\*, 32\*\* a waiting time slightly above the actual rise time is used. This shortens the signal bands 34 in the output signal 33. In this case, the energy filter 22 can resolve the pulse sequence 32, 32\*, 32\*\* in time and the correct height of 30 mV results for all three signals 32, 32\*, 32\*\***. This leads to an improved pulse throughput in the adaptive method described here.

At times when the dynamic filter 2 changes the waiting time, discontinuities occur. However, these discontinuities are not relevant for the pulse evaluation, since they occur at times when the energy filter 2 is not evaluated. By buffering data, the times at which the waiting time changes can be set and therefore these changes can also take place at times at which the energy filter is not evaluated and the discontinuities are not relevant.

There are several possible methods for determining the rise time. For example, a comparison can be made between a slope of the signal and a threshold value. The rise time can also be determined by a duration of the fast filter above a threshold value.

It is possible to change the signal form during analog signal conditioning in the evaluation electronics 15 in order to simplify digitization in the ADC 152. For example, a high-pass filter in the preamplifier 151 can be used to filter the low-frequency leakage current rise from the signal, or an analog subtraction of the estimated leakage current can be performed. This leads to other types of signals arising from the step-shaped signal in the preamplifier output in the ADC signal, which can then be digitally recalculated to the original preamplifier signal. The signal is then digitally processed in the same way as in the case without analog signal conditioning.

The invention described here is not limited by the description given in the exemplary embodiments. Rather, the invention includes any new feature and any combination of features, which in particular includes any combination of features in the patent claims, even if that feature or combination itself is not explicitly mentioned in the patent claims or exemplary embodiments.

What is claimed is:

1. A method for operating a radiation detection system comprising at least one radiation detector and at least one signal filter, the method comprising:
   supplying an input signal to the at least one signal filter by the at least one radiation detector, the input signal having step-shaped signal rises, each step-shaped signal rise having a rise time;
   determining the rise time of a respective step-shaped signal rise;
   specifying a waiting time for the respective step-shaped signal rise in each case such that the waiting time is greater than or equal to the rise time of the respective step-shaped signal rise; and
   producing an output signal of the at least one signal filter, data point pairs of the input signal being processed in which a time interval of data points from each other is equal to the waiting time for the respective step-shaped signal rise,
   wherein at least 80% of rise times of the step-shaped signal rises lie between 10 ns and 800 ns inclusive, and
   wherein the at least one radiation detector comprises a silicon drift detector having a radiation entry window of at least 5 mm$^2$.

2. The method according to claim 1, further comprising generating a signal band in the output signal for each signal rise, and wherein a height and/or an integral of the signal band is proportional to a step height of an associated step-shaped signal rise.

3. The method according to claim 1, further comprising buffering the input signal so that the data points of the input signal relating to the respective step-shaped signal rise are stored at least temporarily.

4. The method according to claim 3,
   wherein supplying the input signal to the at least one signal filter by the at least one radiation detector, buffering the input signal, and producing the output signal of the at least one signal filter are performed continuously and simultaneously,
   wherein determining the rise time of the respective step-shaped signal rise and specifying the waiting time for the respective step-shaped signal rise are each triggered by one of signal rises so that the waiting time remains the same until a new waiting time is determined in a further determination of the rise time on a basis of a subsequent step-shaped signal rise, and wherein a change from the waiting time to the new waiting time takes place abruptly.

5. The method according to claim 1, wherein waiting times assigned to signal rises are partly below 0.8 times and partly above 1.2 times of an average waiting time.

6. The method according to claim 5, further comprising buffering the input signal to the at least one signal filter by the at least one radiation detector so that the data points of the input signal relating to the respective step-shaped signal rise are stored at least temporarily, wherein buffering the input signal to the at least one signal filter by the at least one radiation detector comprises buffering to a maximum waiting time so that enough data is buffered in order to be able to calculate a filter output with the maximum waiting time, so that the data points are discarded after the maximum waiting time has elapsed, and wherein the maximum waiting time is fixed for a particular input signal and the maximum waiting time exceeds the average waiting time by at least a factor 1.5 and by at most a factor 3.

7. The method according to claim 1, further comprising rejecting a further step-shaped signal rise, which follows a preceding step-shaped signal rise within a sum of the waiting time and a pulse forming time, in a signal evaluation of the input signal.

8. The method according to claim 1, further comprising generating the output signal of the at least one signal filter from the data point pairs by a trapezoidal filter, a Gaussian filter, or a Cusp filter.

9. The method according to claim 1, wherein the input signal to the at least one signal filter by the at least one radiation detector comprises a pre-amplified signal and a digitized signal of the at least one radiation detector.

10. A radiation detection system comprising:
at least one radiation detector;
a charge-sensitive amplifier; and
evaluation electronics comprising a preamplifier, an analog-digital converter (ADC), and at least one signal filter configured to perform digital signal processing,
wherein the evaluation electronics follows the charge-sensitive amplifier,
wherein the evaluation electronics includes, seen from the charge-sensitive amplifier, the preamplifier, the analog-digital converter (ADC), and the at least one signal filter,
wherein the at least one radiation detector comprises at least one radiation-sensitive region and at least two electrodes connected to the at least one radiation-sensitive region,
wherein the at least one radiation detector is configured to supply an input signal to the at least one signal filter,
wherein the at least one signal filter is configured to provide an output signal of the evaluation electronics,
wherein the input signal comprises step-shaped signal rises, each step-shaped signal rise having a rise time,
wherein at least 80% of rise times of step-shaped signal rises lie between 10 ns and 800 ns inclusive, and
wherein the at least one radiation detector comprises a silicon drift detector having a radiation entry window of at least 5 $mm^2$.

11. The radiation detection system according to claim 10, wherein the evaluation electronics is configured to generate X-ray spectra, and wherein the at least one radiation detector is configured to detect X-rays.

12. The radiation detection system according to claim 10, wherein the radiation detection system is an Energy Dispersive X-ray spectroscopy (EDX) system.

* * * * *